Patented Nov. 19, 1929

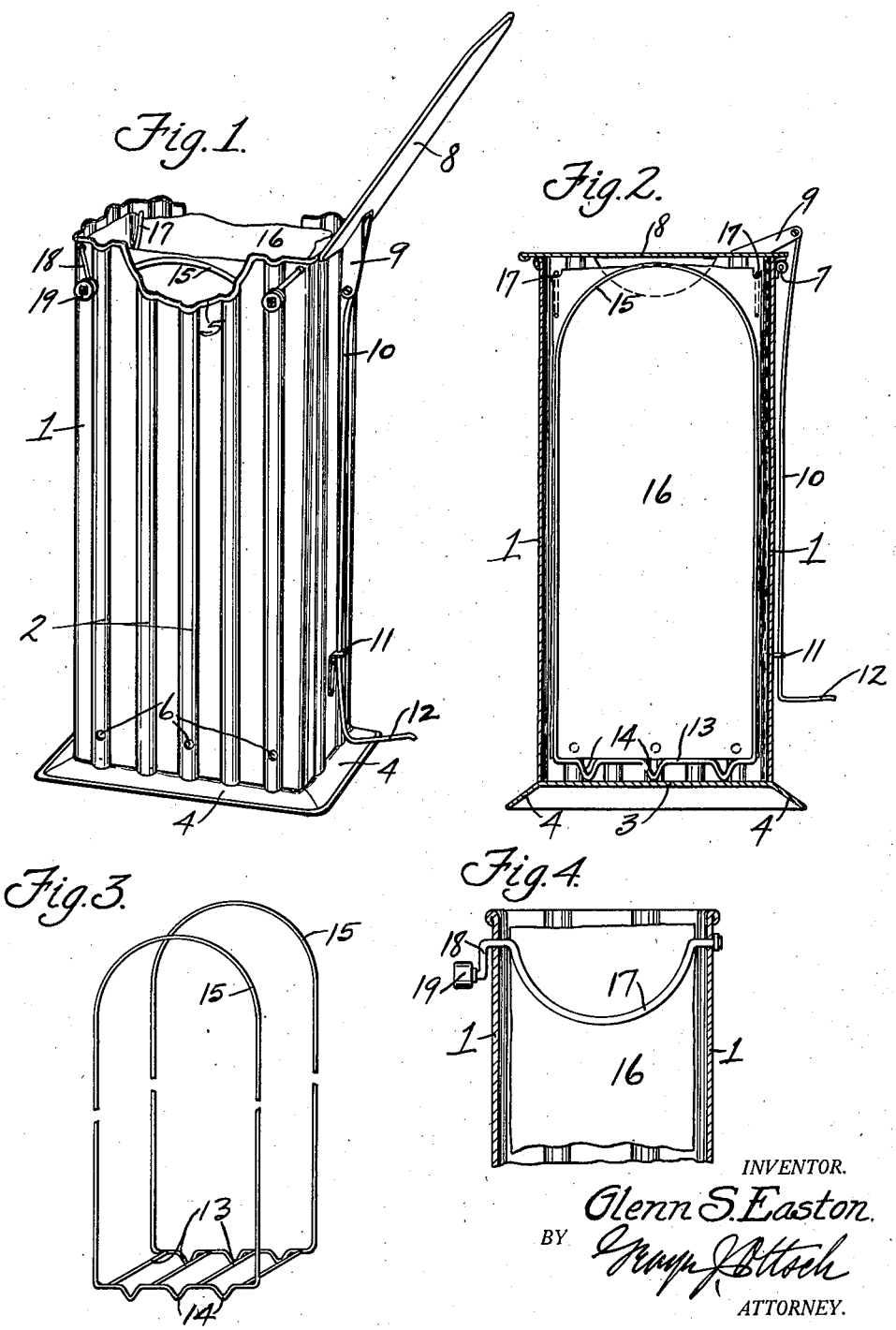

1,736,192

UNITED STATES PATENT OFFICE

GLENN S. EASTON, OF BUCHANAN, MICHIGAN

REFUSE CONTAINER

Application filed May 23, 1928. Serial No. 279,939.

The invention relates to refuse containers, particularly to household garbage containers, and has for its object to provide a device of this character having an outer casing and a removable receptacle disposed in said casing, said receptacle being preferably made of paper or other combustible material, the removable receptacle forming means whereby the refuse will not come in contact with the casing and also whereby the refuse may be easily removed from the container for incineration or other disposal.

A further object is to provide a device of this character having an outer supporting casing and a receptacle disposed in said casing, said receptacle being made of cheap material which can be destroyed with the refuse which it contains.

A further object is to provide a device of this character having a supporting casing and a receptacle disposed in said casing, said casing and receptacle being so formed and positioned that air currents may pass between the casing and the receptacle to minimize the odor generated in the casing.

A further object is to provide a device of this character having an outer supporting casing, a removable receptacle disposed in the casing, and a carrier frame disposed within the outer casing and supporting the receptacle in spaced relation with the outer casing, and adapted to facilitate ready removal of the filled receptacle and for conveyance thereof.

A further object is to provide a device of this character having a top hingedly secured thereto, and means whereby the top may be raised by the application of foot pressure.

A further object is to provide a device of this character having a metal casing, a collapsible receptacle disposed in said casing, a supporting frame for said receptacle disposed in said casing, and means whereby the open end of the collapsible receptacle may be held in open position.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the device showing the top in raised position.

Figure 2 is a vertical transverse sectional view of the device showing the inner receptacle and its supporting frame.

Figure 3 is a perspective view of the frame which supports the receptacle within the outer casing.

Figure 4 is a fragmentary vertical transverse sectional view of the outer casing and the receptacle showing one of the U-shaped members which hold the upper end of the receptacle in open position.

Referring to the drawing, the numeral 1 designates the outer casing of the container, which is preferably made of metal, and which has vertical corrugations 2 formed in the sides thereof. The base 3 of the outer casing 1 is provided at its marginal edges with outwardly and downwardly inclined flanges 4 which hold the bottom of the casing above the ground. At the center of the opposite upper sides of the casing 1 are formed the semicircular openings 5 which cooperate with the holes 6 formed in the casing 1 at the bottom of the corrugations 2 formed therein to provide means whereby air currents may flow up between the inner sides of the casing 1 and a refuse receiving receptacle placed therein for the purpose of air drying the refuse and to minimize the generation of odors.

Secured to the upper end of the casing 1 by means of the hinges 7 is a top 8 which covers the open end of the casing. At the center of the top 8 adjacent the hinged edge thereof is secured an arm 9 which projects angularly upwardly and outwardly from the top. Pivotally connected to the outer end of the arm 9 is a rod 10 which extends downwardly along the side of the casing, and which is slidably guided at the side of the casing by an apertured lug 11 secured to the casing, and through which it is adapted to reciprocate. The bottom end of the rod 10 near the bottom of the casing is bent outwardly, thus forming a pedal member 12 by means of which the top 8 may be raised by pressure of the foot applied to the pedal member.

Disposed within the casing 1 is a grid member 13 having legs 14 which rest upon the bottom 3 of the casing 1, and provided with handles 15 extending to the upper end of the casing and accessible to be gripped by the hands by virtue of the openings 5 in the casing, thus forming means whereby the grid and refuse receiving receptacle disposed thereon may be easily removed from the casing. Disposed within the casing 1 and upon the grid 13 is a receptacle 16, which is preferably made of paper or other cheap adaptable material, and which is held in the casing in spaced relation to the bottom 3 of the casing 1. At the upper end of the casing at opposite sides thereof are partially rotatably mounted U-shaped members 17 having a crank arm 18 and a handle 19 disposed without the casing, said crank arm forming means by which said members 17 are rotated, and said U-shaped members 17 forming means whereby the upper end of the collapsible receptacle 16 may be held in open position.

In the use of the device the collapsible receptacle 16 is placed in the casing 1 supported by the grid 13 in spaced relation with the bottom 3 of the casing 1. The U-shaped members 17 are then adjusted against the opposite inner sides of the receptacle 16, thus holding the upper end of the receptacle against the sides of the casing and in open position for the reception of the refuse, such means being necessary to hold a paper or other collapsible receptacle in open position. The spaced relation between the bottom of the receptacle 16 and the bottom 3 of the casing 1 serves together with the corrugations 2, the holes 6, and the openings 5 of the casing to allow air currents to circulate in the casing between the casing and the bottom and sides of the receptacle 16. Ventilation is thus provided tending to air dry and reduce the odor of the garbage or refuse. It will also be seen that by means of the handles 15 of the grid 13 carrying the receptacle 16, the receptacle may easily be removed from the casing when it is filled, and a new receptacle disposed therein, thus allowing the refuse to remain in the removable receptacle wherein it may be easily and simply handled with a minimum of dirt and trouble, and paper receptacles being cheap they may be destroyed together with the refuse as by burning or otherwise. Furthermore, as the paper receptacle serves as a lining for the casing, none of the refuse comes in contact with the casing, so that the latter always remains clean and in a highly sanitary condition.

The invention having been set forth, what is claimed as new and useful is:

1. A container comprising an outer casing, a receptacle disposed within said outer casing, carrier means disposed within said outer casing supporting said receptacle and adapted for removing the same from the casing, means whereby air currents are allowed to pass between said outer casing and said receptacle, and means carried by said casing and supporting said receptacle at the upper end thereof.

2. A container comprising a metal casing a removable receptacle disposed in said outer casing, a carrier frame disposed in said casing and supporting said receptacle, and means carried by the casing for positioning said removable receptacle therein.

3. A container comprising a metal casing, a removable receptacle disposed in said metal casing, a carrier frame disposed in said casing and supporting said receptacle, and U-shaped members carried by the upper end of the outer casing and adapted to engage the upper end of said receptacle.

4. A container comprising a corrugated casing, a destructible flexible receptacle disposed within said casing, a grid member disposed in said casing and carrying said receptacle with the bottom of the casing in spaced relation with said grid to allow air to circulate beneath and between the sides of said casing and receptacle.

5. A container comprising a corrugated casing, a destructible flexible receptacle disposed within said casing, a grid member disposed in said casing and carrying said receptacle in spaced relation to said casing, said casing having holes formed therein near the bottom of the corrugations thereof.

6. A container comprising a corrugated casing, a removable flexible receptacle disposed within said casing, a grid disposed in said casing and holding said receptacle in spaced relation with the bottom of the casing, and U-shaped members partially rotatable and supported at opposite sides of said casing and adapted to engage the upper end of said receptacle to hold the same distended, said corrugations having vent holes formed therein at the lower ends thereof.

7. A container for refuse comprising a casing, a flexible removable bag disposed within the casing, means for holding the open end of the bag in distended position, and a carrier for the bag adapted for removing the filled bag from the casing.

In testimony whereof I affix my signature.

GLENN S. EASTON.